US011447143B2

(12) United States Patent
Dadam et al.

(10) Patent No.: US 11,447,143 B2
(45) Date of Patent: Sep. 20, 2022

(54) METHODS AND SYSTEM FOR ADJUSTING VEHICLE OPERATION BASED ON A PREDICTED STATE OF A VEHICLE OCCUPANT

(71) Applicant: Ford Global Technologies, LLC, Dearborn, MI (US)

(72) Inventors: Sumanth Reddy Dadam, Dearborn, MI (US); Vinod Ravi, Canton, MI (US); Hani Mohammad Ayesh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 276 days.

(21) Appl. No.: 16/657,176

(22) Filed: Oct. 18, 2019

(65) Prior Publication Data

US 2021/0114603 A1 Apr. 22, 2021

(51) Int. Cl.
*B60W 50/00* (2006.01)
*B60W 10/22* (2006.01)
*B60W 10/30* (2006.01)
*B60W 40/08* (2012.01)
*F02D 13/02* (2006.01)
*G06K 9/00* (2022.01)
(Continued)

(52) U.S. Cl.
CPC ........ *B60W 50/0098* (2013.01); *B60W 10/22* (2013.01); *B60W 10/30* (2013.01); *B60W 40/08* (2013.01); *F02D 13/0242* (2013.01); *G06V 20/593* (2022.01); *G06V 40/176* (2022.01); *B60W 2710/30* (2013.01)

(58) Field of Classification Search
CPC .. B60W 50/0098; B60W 10/22; B60W 10/30;
B60W 40/08; B60W 2710/30; F02D
13/0242; F02D 9/04; F02D 29/02; G06V
20/593; G06V 40/176; G06V 20/597;
B60G 17/0165; B60G 2400/30; B60G
2400/34; B60G 2400/39; B60G 2400/90;
B60G 2401/142; B60G 2500/10; B60G
17/0195; B60Q 3/80; Y02T 10/40; F01N
1/065; F01N 1/168; F01N 9/00
See application file for complete search history.

(56) References Cited

U.S. PATENT DOCUMENTS 10,232,846 B2 3/2019 Myers et al.
2004/0226537 A1* 11/2004 Held ................... F02B 27/04
123/324

(Continued)

FOREIGN PATENT DOCUMENTS

WO 2017190085 A1 11/2017

OTHER PUBLICATIONS

Kelly, H., "Ford made a crib that acts like a car," CNN Website, Available Online at https://money.cnn.com/2017/04/07/technology/ford-crib-max/index.html, Apr. 10, 2017, 5 pages.

*Primary Examiner* — Brian P Sweeney
(74) *Attorney, Agent, or Firm* — Vincent Mastrogiacomo; McCoy Russell LLP

(57) ABSTRACT

A method for operating a vehicle that includes a passenger is described. In one example, the method adjusts vehicle suspension and exhaust system sound in response to characteristics of the passenger that are monitored via a camera and a microphone. The method may operate the vehicle suspension and exhaust system in a way that sooths the passenger.

6 Claims, 8 Drawing Sheets

(51) Int. Cl.
  *G06V 20/59* (2022.01)
  *G06V 40/16* (2022.01)

(56) References Cited

U.S. PATENT DOCUMENTS

2014/0343788 A1    11/2014  Hosey et al.
2020/0269848 A1*   8/2020   Kang .................... G06N 20/00

* cited by examiner

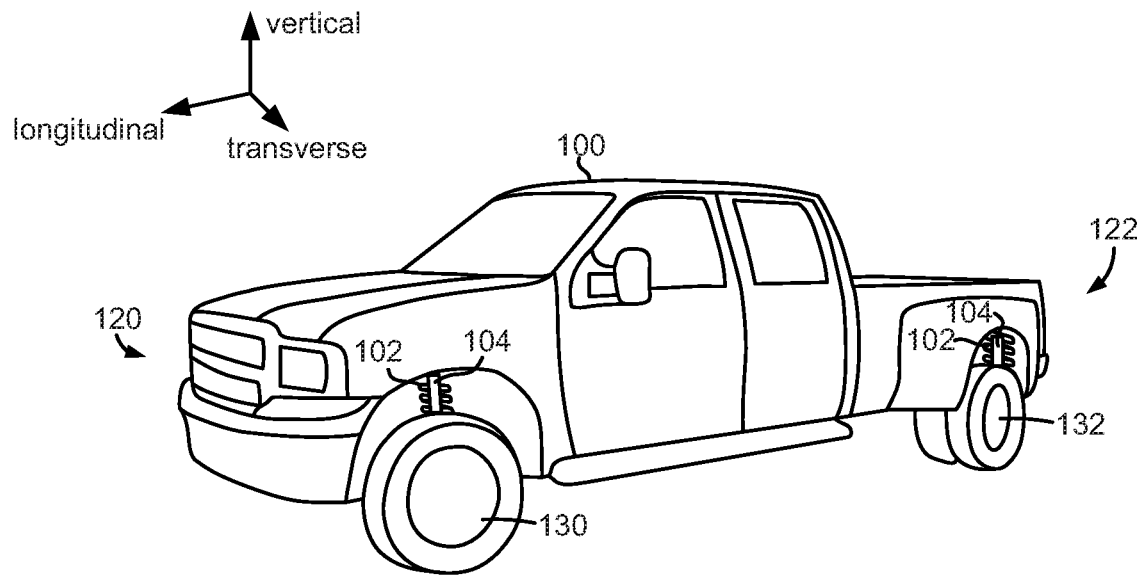
FIG. 1
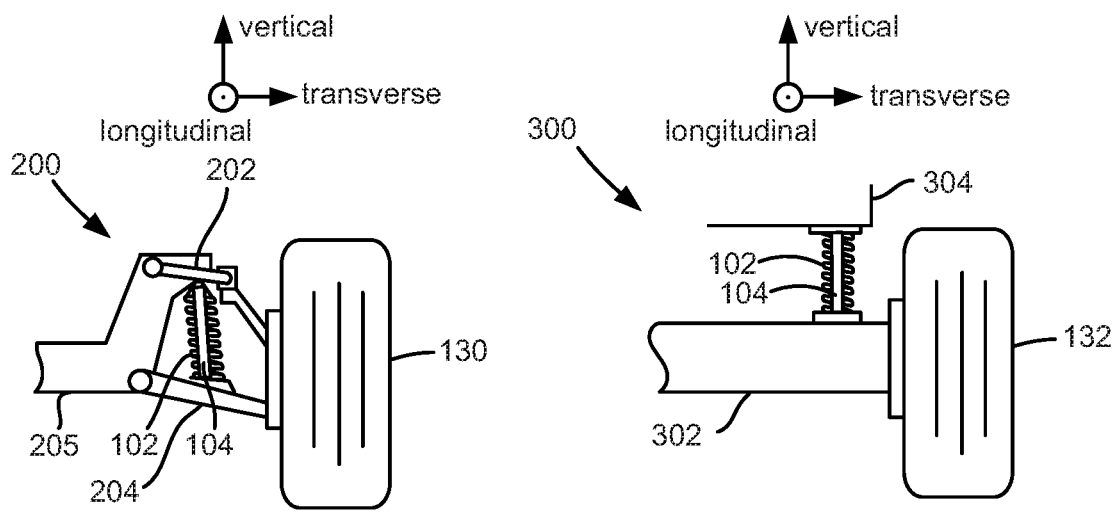
FIG. 2
FIG. 3

US 11,447,143 B2

METHODS AND SYSTEM FOR ADJUSTING VEHICLE OPERATION BASED ON A PREDICTED STATE OF A VEHICLE OCCUPANT

FIELD

The present description relates to methods and a system for adjusting an environment of a vehicle passenger cabin and vehicle ride according to a predicted state of a vehicle occupant. The methods and systems may help to change a disposition of one or more vehicle occupants to improve customer satisfaction.

BACKGROUND AND SUMMARY

A vehicle may be used from time to time to transport children including infants. The children and/or infant may become irritable during conditions when they are not being fed or given attention. The children may cry or be agitated such that it may be difficult for the driver of the vehicle to concentrate on driving. Consequently, the driver may have to pull over and provide attention to the child until the child calms down and stops crying. However, there may be times when it may be inconvenient for the driver to pull over and comfort the child. For example, the vehicle may be traveling on a highway with limited rest areas and exits. In addition, the driver may not have time to pull over and comfort the child due to time constraints or other circumstances. Therefore, it may be desirable to provide a way of comforting a child or at least entertaining the child so that the driver and the child have a better experience while they are traveling.

The inventors herein have recognized the above-mentioned issues and have developed a vehicle operating method, comprising: monitoring facial expressions of a vehicle occupant via a camera; and adjusting a position of an exhaust valve of an engine in response to the monitored facial expressions via a controller.

By adjusting a position of an exhaust valve of an engine in response to monitored facial expressions, it may be possible to provide the technical result of calming and soothing a child that is an occupant of a vehicle so that the vehicle's driver may continue to concentrate on driving the vehicle. In one example, the vehicle's exhaust sound amplitude may be changed such that less exhaust sound may be noticed within a passenger cabin of a vehicle. In addition, sound levels created by artificial engine exhaust sound enhancing devices may be reduced or adjusted based on facial features and noises generated by vehicle occupants such that less exhaust sound may be perceived in the vehicle's passenger cabin. Additionally, suspension settings of the vehicle may be adjusted based on facial features of vehicle occupants so that a child within the passenger cabin may have an easier time going to sleep. Consequently, it may be possible provide an environment within a vehicle that comforts young children and allows them to rest.

The present description may provide several advantages. Specifically, the approach may make it easier to care for small children that are being transported by a vehicle. Further, the approach may recognize when it may be desirable to adjust vehicle operation so that a child may find it easier to sleep. In addition, the approach may provide several different ways to automatically calm a child that is agitated or tired.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 shows a schematic diagram of an example vehicle;

FIGS. 2 and 3 show example vehicle suspension systems that include adjustable dampeners;

DETAILED DESCRIPTION

Figure 4:
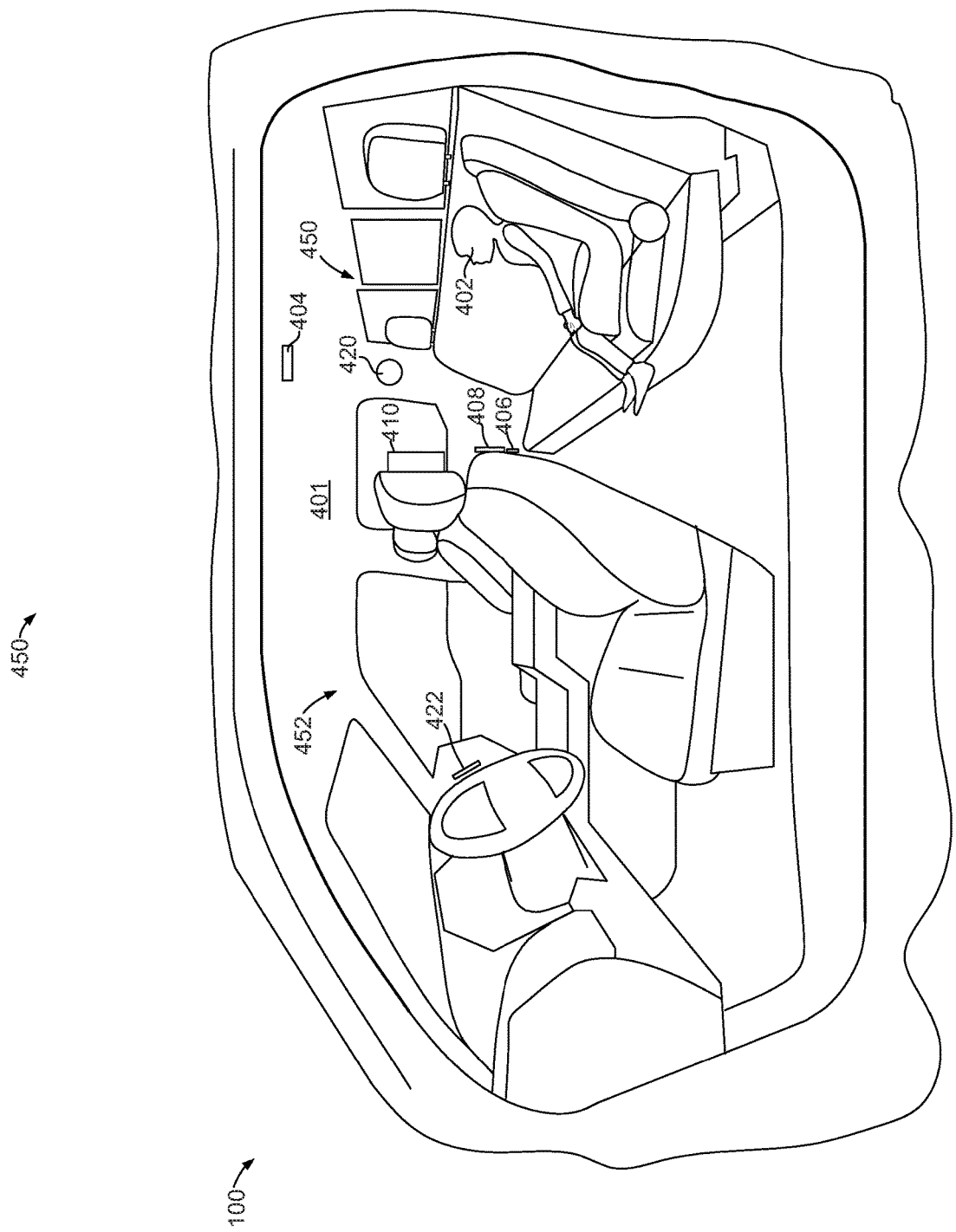
FIG. 4 shows an example vehicle passenger cabin or interior with devices to recognize dispositions of vehicle occupants and devices to modify those dispositions.
Figure 7:
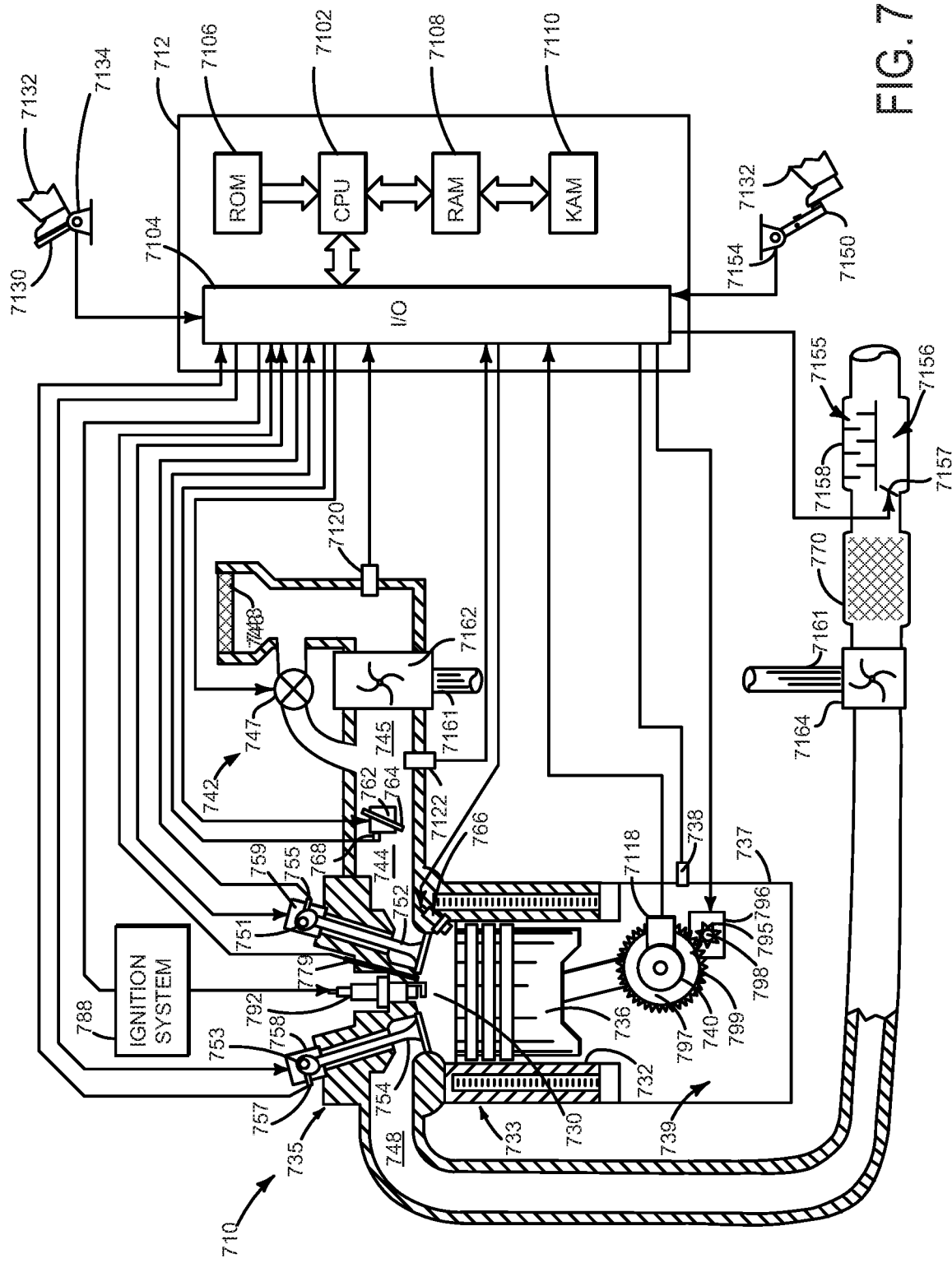
FIG. 7 shows a schematic diagram of an example vehicle engine that includes an adjustable exhaust valve.
Figure 8:
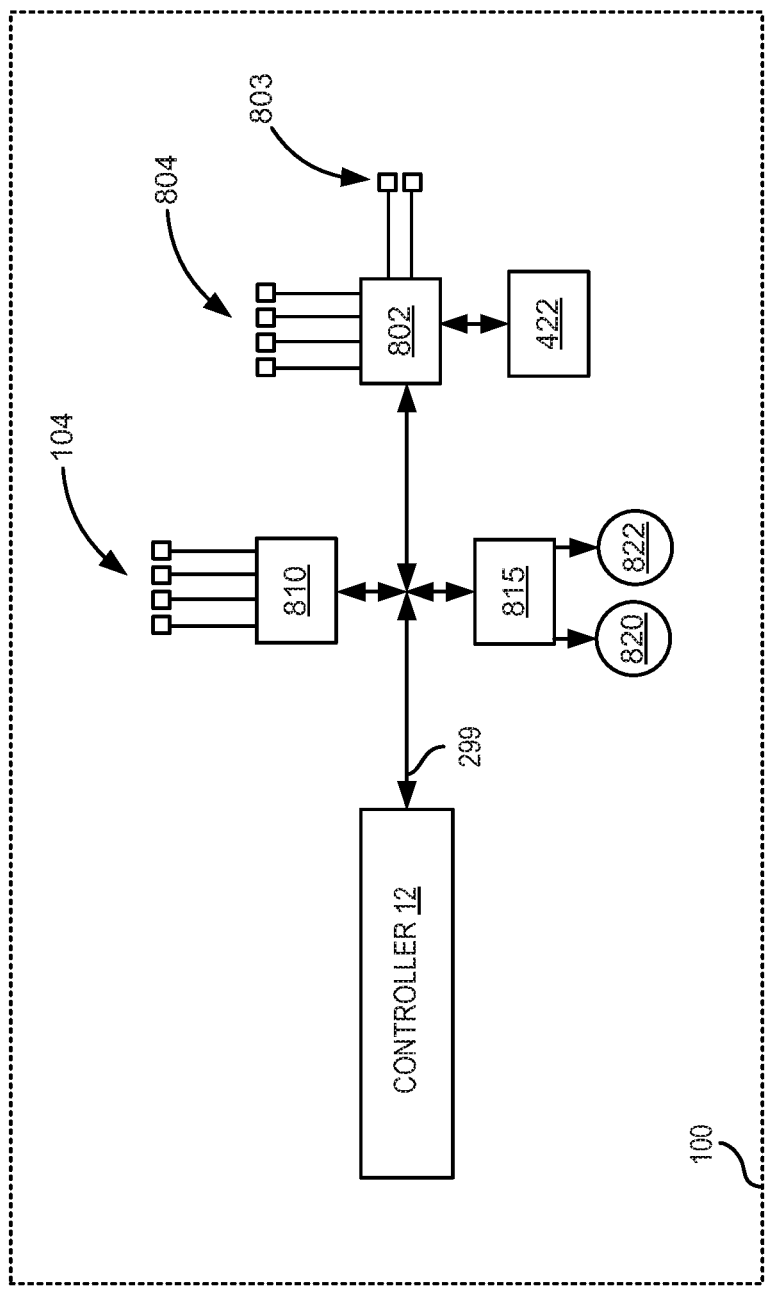
FIG. 8 shows a block diagram of several example vehicle controllers.
Figure 9:
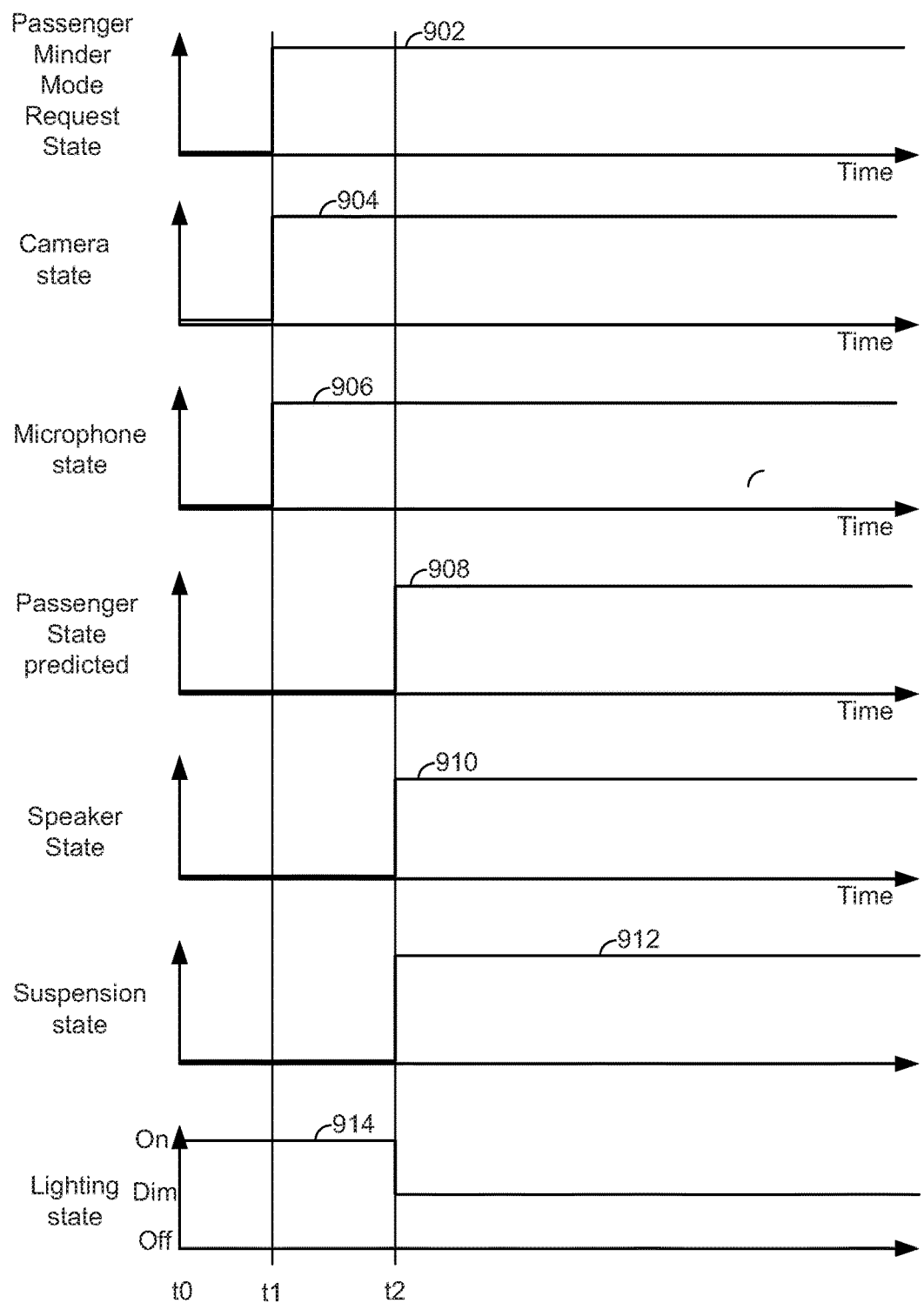
FIG. 9 shows an example vehicle operating sequence according to the method of FIGS. 10 and 11.

The present description relates to adjusting passenger cabin conditions to calm a child so that a driver of the vehicle may concentrate on driving. The vehicle may be a passenger vehicle of the type shown in FIG. 1 or a car. The vehicle may include a suspension system as shown in FIGS. 2 and 3 that includes adjustable dampeners for changing vehicle ride characteristics. For example, the vehicle's suspension system may be adjusted to smooth and soften the ride of the vehicle so that a child may fall asleep easier. Conversely, if the child is not present in the vehicle, the ride of the vehicle may be stiffened such that the vehicle sways less while the vehicle is turning. The vehicle may include an interior or passenger cabin as shown in FIG. 4. The passenger cabin may include an infotainment system, a camera, a microphone, and other sensors and actuators for sensing and adjusting conditions within the passenger cabin. The vehicle's systems may recognize a state of a child or emotions of a child for the purpose of modifying conditions within the passenger cabin to change the state of the child or the emotions of the child. The vehicle may include an engine and exhaust system of the type that is shown in FIG. 7. Operation of the engine and vehicle may be controlled via a group of controllers as shown in FIG. 8. The system of FIGS. 1-4 and 7-8 may provide the vehicle operating sequence that is shown in FIG. 9. The vehicle may be operated according to the methods of FIGS. 10 and 11 to provide the operating sequence shown in FIG. 9.

Referring now to FIG. 1, vehicle 100 is shown relative to longitudinal, vertical, and transverse directions. Vehicle 100 includes a front end 120 and a rear end 122. Seating in vehicle 100 is arranged such that passengers when properly seated look in a direction of front end 120. Vehicle 100 includes front wheel 130 and rear wheel 132. Front wheel 130 is coupled to a spring 102 and an adjustable dampener 104. In one example, adjustable dampener 104 is a magnetorheological damper that includes magnetic particles that may be exposed to a magnetic field to control dampening at a wheel of the vehicle. Similarly, rear wheel 132 is coupled to spring 102 and adjustable dampener 104. A suspension controller on-board vehicle 100 may control an amount of electrical current that flows to adjustable dampener 104, thereby controlling the suspension dampening of vehicle 104.

Referring now to FIG. 2, front suspension 200 includes vehicle frame 205, upper control arm 202, lower control arm 204, spring 102, and adjustable damper 104. Upper control arm 202 and lower control arm 204 couple frame 205 to wheel 130. Spring 102 provides force to support frame 205, and frame 205 may support a vehicle chassis (not shown). Adjustable damper 104 may dampen spring oscillations that may be due to cornering the vehicle or road surface discontinuities.

Referring now to FIG. 3, rear suspension 300 includes axle 302, spring 102, and adjustable dampener 104. Axle 302 and spring 102 support vehicle chassis 304. Wheel 132 supports and is coupled to axle 302. In this example, rear suspension 300 is shown as a straight axle, but in other configurations it may be an independent rear suspension.

Referring now to FIG. 4, an interior or passenger cabin 401 of vehicle 100 is shown. Passenger cabin includes dimmable lighting 404, speakers 420, display panel 410, microphone 406, human/machine interface 422, and camera 408. In this example, camera 408 and microphone 406 are configured to sense conditions of vehicle occupant 402 (e.g., a human child) in rear seat area 450. Dimmable lighting 404, speakers 420, and display panel 410 may be selectively adjusted to change the environment of passenger compartment 401 in response to sensed emotions or physical states of vehicle occupant 402. For example, if the vehicle is traveling at night on a dark street at and vehicle occupant 402 is not asleep, lighting 404 may be adjusted to a low lumen level so that the vehicle's driver is not disturbed by the light, yet the vehicle occupant 402 may see his/her surroundings. Further, display panel 410 may be activated and display a predetermined program that is believed to make vehicle occupant 402 happy. Speakers 420 may also be activated to provide a predetermined genre of music (e.g., classical or popular) at sound levels that are believed to improve the disposition of vehicle occupant 402 when camera and/or microphone indicate that vehicle occupant is in an undesirable emotional state (e.g., crying or angry).

In other examples, microphone 406 and camera 408 may be configured to sense conditions of an occupant in front seating area 452. Further, dimmable lighting 404, speakers 420, display panel 410 may be adjusted to alter an emotional state of an occupant of front seating are 452.

Figure 5:
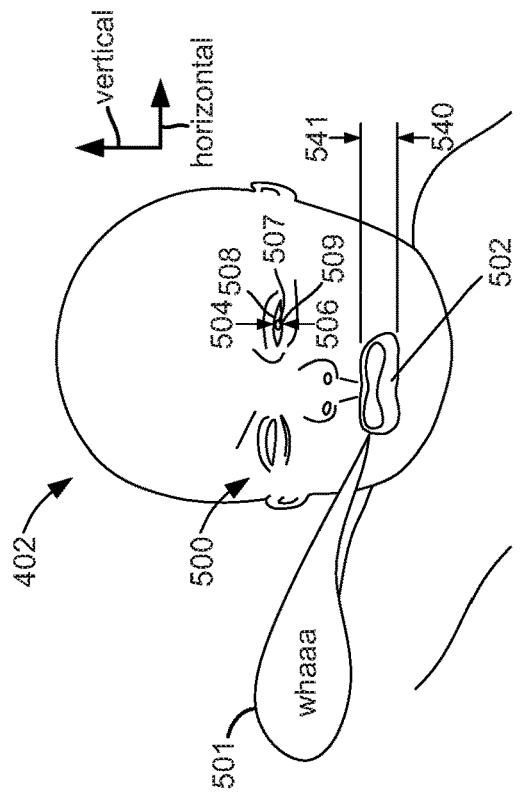

Referring now to FIG. 5, vehicle occupant 402 is shown in an angry emotional state. Camera 404 and a controller may predict that vehicle occupant 402 is angry by assessing features of face 500 and sound 501 of vehicle occupant 402. In particular, a vehicle system controller 802 shown in FIG. 8, or alternatively, a dedicated controller 815 shown in FIG. 8, may process images from camera 404 and sound from microphone 406 to determine the emotional and physical state of vehicle occupant 402. For example, a controller may use facial recognition software to judge if vehicle occupant 402 is angry and/or crying via measuring the vertical opening of mouth 502 as indicated between arrows 541 and 540 to determine if vehicle occupant 402 is crying or screaming. Further, the controller may measure a distance between upper eye lid 508 and lower eye lid 509 at the area of pupal 507 as indicated by the distance between arrow 504 and arrow 506 to determine if vehicle occupant is tired and/or crying and/or angry. The distance between the upper eye lid 504 and the lower eye lid 506 may be determined via the camera and it may be described as detecting eye lid droop. The controller may predict that vehicle occupant is crying when the vertical distance between tips of arrows 541 and 540 is small and while sound 501 measured via microphone 406 is large higher in pitch. The controller may predict that vehicle occupant is tired when a distance between upper eye lid 508 and lower eye lid 509 is small. In addition, the controller may predict that vehicle occupant 402 is tired when the ratio of the amount of time that the upper eye lid 508 is open to the amount of time the upper eye lid 508 is closed is small. In this example, the opening of mouth 502 is small, noise 501 is loud, and eye opening amount between upper lid 508 and lower lid 509 is small so that the controller may judge that vehicle occupant is crying.

Figure 6:
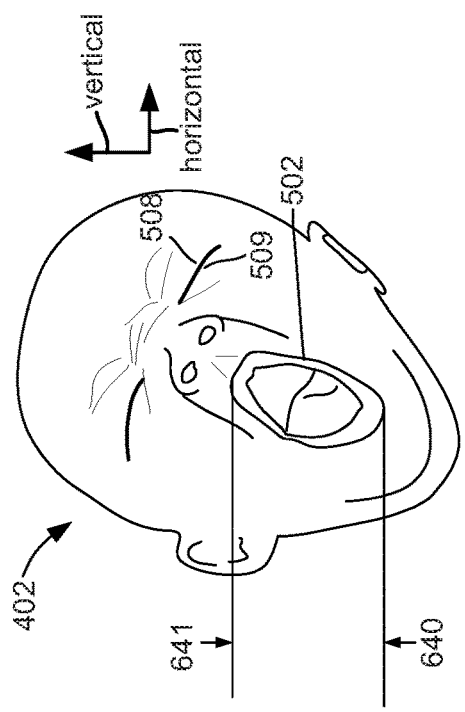
FIGS. 5 and 6 show example expressions of children that may be recognized via the system described herein.

Referring now to FIG. 6, vehicle occupant 402 is shown in a tired state. Camera 404 and a controller may predict that vehicle occupant 402 is tired when eyes lids 508 and 509 are closed (as shown) and when opening amount of mouth 502 is large. In this example, the opening distance of mouth 502 is indicated as the distance between the tips of arrows 641 and 640. The distance between the upper eye lid 508 and the lower eye lid 509 is zero since the lower eye lid 509 is touching the upper eye lid 508 about the pupal (not shown). Such conditions may be indicative of vehicle occupant 402 being tired.

Thus, it may be observed that the facial expression of vehicle occupant 402 is different between FIG. 5 and FIG. 6. The difference in facial expression may be observed via camera 404 and a controller that is executing facial recognition software. The differences in facial expressions may be the basis for adjusting the environment in the vehicle passenger cabin 401 shown in FIG. 4. These adjustments may make it easier for a child to go to sleep or to sleep. Further, if the child is awake and not tired, the child may be entertained via the vehicle's infotainment system that includes a display panel 408 and speakers.

Referring to FIG. 7, internal combustion engine 710, comprising a plurality of cylinders, one cylinder of which is shown in FIG. 7, is controlled by electronic engine controller 712. Engine 710 is comprised of cylinder head 735 and block 733, which include combustion chamber 730 and cylinder walls 732. Piston 736 is positioned therein and reciprocates via a connection to crankshaft 740. Flywheel 797 and ring gear 799 are coupled to crankshaft 740. Starter 796 (e.g., low voltage (operated with less than 20 volts) electric machine) includes pinion shaft 798 and pinion gear 795. Pinion shaft 798 may selectively advance pinion gear 795 to engage ring gear 799. Starter 796 may be directly mounted to the front of the engine or the rear of the engine. In some examples, starter 796 may selectively supply torque to crankshaft 740 via a belt or chain. In one example, starter 796 is in a base state when not engaged to the engine crankshaft.

Combustion chamber 730 is shown communicating with intake manifold 744 and exhaust manifold 748 via respective intake valve 752 and exhaust valve 754. Each intake and exhaust valve may be operated by an intake cam 751 and an exhaust cam 753. The position of intake cam 751 may be determined by intake cam sensor 755. The position of exhaust cam 753 may be determined by exhaust cam sensor 757. A phase or position of intake valve 752 may be adjusted relative to a position of crankshaft 740 via valve phase changing device 759. A phase or position of exhaust valve 754 may be adjusted relative to a position of crankshaft 740 via valve phase changing device 758. Valve phase changing devices 758 and 759 may be electro-mechanical devices, hydraulic devices, or mechanical devices.

Engine 710 includes a crankcase 739 that houses crankshaft 740. Oil pan 737 may form a lower boundary of crankcase 739 and engine block 733 and piston 736 may constitute an upper boundary of crankcase 739. Crankcase 739 may include a crankcase ventilation valve (not shown) that may vent gases to combustion chamber 730 via intake manifold 744. A temperature of oil in crankcase 739 may be sensed via temperature sensor 738.

Fuel injector 766 is shown positioned to inject fuel directly into cylinder 730, which is known to those skilled in the art as direct injection. Fuel injector 766 delivers liquid fuel in proportion to the pulse width from controller 712. Fuel is delivered to fuel injector 766 by a fuel system (not shown) including a fuel tank, fuel pump, and fuel rail (not shown). In one example, a high pressure, dual stage, fuel system may be used to generate higher fuel pressures.

In addition, intake manifold 744 is shown communicating with turbocharger compressor 7162 and engine air intake 742. In other examples, compressor 7162 may be a supercharger compressor. Shaft 7161 mechanically couples turbocharger turbine 7164 to turbocharger compressor 7162. Optional electronic throttle 762 adjusts a position of throttle plate 764 to control air flow from compressor 7162 to intake manifold 744. Pressure in boost chamber 745 may be referred to a throttle inlet pressure since the inlet of throttle 762 is within boost chamber 745. The throttle outlet is in intake manifold 744. In some examples, throttle 762 and throttle plate 764 may be positioned between intake valve 752 and intake manifold 744 such that throttle 762 is a port throttle. Compressor recirculation valve 747 may be selectively adjusted to a plurality of positions between fully open and fully closed. Waste gate 7163 may be adjusted via controller 712 to allow exhaust gases to selectively bypass turbine 7164 to control the speed of compressor 7162. Air filter 743 cleans air entering engine air intake 742.

Distributorless ignition system 788 provides an ignition spark to combustion chamber 730 via spark plug 792 in response to controller 712. Engine 710 includes an exhaust system 799 including an exhaust manifold 748 and a catalytic converter 770. Exhaust system 799 also includes muffler 7158 that includes an exhaust valve 7157 a first baffled exhaust path 7155 and a second non-baffled exhaust path 7156. Exhaust valve 7157 may be fully closed, fully opened, or partially opened to increase or decrease amplitude of sound from engine 710. When exhaust valve 7157 is in a fully open position, a greater portion of exhaust gases may flow through non-baffled exhaust path 7156 to increase engine performance and engine exhaust sound level. When exhaust valve 7157 is in a fully closed position, a greater portion of exhaust gases flow though baffled exhaust path 7155 to reduce the engine exhaust sound level. When exhaust valve 7157 is in a partially open position, a portion of exhaust gases may flow through non-baffled exhaust path 7156 and a portion of exhaust gases may flow through baffled exhaust path 7155 so that the engine exhaust sound is a little louder, but not as loud as when exhaust valve 7157 is fully opened.

Converter 770 can include multiple catalyst bricks, in one example. In another example, multiple emission control devices, each with multiple bricks, can be used. Converter 770 can be a three-way type catalyst in one example.

Controller 712 is shown in FIG. 7 as a conventional microcomputer including: microprocessor unit 7102, input/output ports 7104, read-only memory 7106 (e.g., non-transitory memory or ROM), random access memory 7108 (RAM), keep alive memory 7110, and a conventional data bus. Controller 712 is shown receiving various signals from sensors coupled to engine 710, in addition to those signals previously discussed, including: a position sensor 7134 coupled to an accelerator pedal 7130 for sensing force applied by human foot 7132; a position sensor 7154 coupled to brake pedal 7150 for sensing force applied by foot 7152, a measurement of engine manifold pressure (MAP) from pressure sensor 7122 coupled to intake manifold 744; an engine position sensor from a Hall effect sensor 7118 sensing crankshaft 740 position; a measurement of air mass entering the engine from sensor 7120; cylinder pressure from pressure sensor 779; and a measurement of throttle position from sensor 768. Barometric pressure may also be sensed (sensor not shown) for processing by controller 712. In a preferred aspect of the present description, engine position sensor 7118 produces a predetermined number of equally spaced pulses every revolution of the crankshaft from which engine speed (RPM) can be determined.

During operation, each cylinder within engine 710 typically undergoes a four stroke cycle: the cycle includes the intake stroke, compression stroke, expansion stroke, and exhaust stroke. During the intake stroke, generally, the exhaust valve 754 closes and intake valve 752 opens. Air is introduced into combustion chamber 730 via intake manifold 744, and piston 736 moves to the bottom of the cylinder so as to increase the volume within combustion chamber 730. The position at which piston 736 is near the bottom of the cylinder and at the end of its stroke (e.g. when combustion chamber 730 is at its largest volume) is typically referred to by those of skill in the art as bottom dead center (BDC).

During the compression stroke, intake valve 752 and exhaust valve 754 are closed. Piston 736 moves toward the cylinder head so as to compress the air within combustion chamber 730. The point at which piston 736 is at the end of its stroke and closest to the cylinder head (e.g. when combustion chamber 730 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 792, resulting in combustion.

During the expansion stroke, the expanding gases push piston 736 back to BDC. Crankshaft 740 converts piston movement into a rotational torque of the rotary shaft. Finally, during the exhaust stroke, the exhaust valve 754 opens to release the combusted air-fuel mixture to exhaust manifold 748 and the piston returns to TDC. Note that the above is shown merely as an example, and that intake and exhaust valve opening and/or closing timings may vary, such as to provide positive or negative valve overlap, late intake valve closing, or various other examples.

FIG. 8 is a block diagram of the various controllers that are included in vehicle 100. The various controllers may communicate with each other via controller area network 299. For example, vehicle system controller 802 may determine vehicle operating conditions via sensors 803 and actuators 804. Sensors 803 may include camera 408 and microphone 406. Actuators may include display panel 410, speakers 420, and lighting 404. Vehicle system controller 802 may also include facial recognition software and executable instructions to operate display panel 410 and speakers 420 as an infotainment system such that images may be displayed via display panel 410 and audio may be played via speakers 420. Vehicle system controller 802 may operate the facial recognition software as part of a vehicle passenger minder system. Vehicle system controller 802 may receive data and control parameters from engine controller 12, suspension system controller 810, and passenger cabin heating, ventilation, and air conditioning controller 815. Vehicle system controller 802 may also command engine controller 12, suspension controller 810, and passenger cabin heating, ventilation, and air conditioning controller 815 to adjust vehicle operating conditions including operation of the suspension, display 410, speakers 420, and lighting 404.

Vehicle suspension controller 810 may adjust an amount of electrical current that is supplied to adjustable dampeners 104 to change the ride of vehicle 100. For example, controller 810 may adjust electrical current that is supplied to adjustable dampeners 104 to stiffen the vehicle suspension or to soften the vehicle suspension. In one example, vehicle suspension controller 810 may soften the suspension of vehicle 100 in response to a request from vehicle system controller 802 that is based on facial expressions and sounds of vehicle occupant 402. Softening the suspension may provide a smoother vehicle ride that may allow vehicle occupant 402 to fall asleep.

Passenger cabin heating, ventilation, and air conditioning controller 815 may adjust a temperature of passenger cabin 401 via increasing or decreasing output of compressor 820 and fan 822. In one example, passenger cabin heating, ventilation, and air conditioning controller 815 may control a temperature of passenger cabin 401 to a predetermined cool temperature (e.g., 18° C.) in response to a request from vehicle system controller 802 that is based on facial expressions and sounds of vehicle occupant 402 when vehicle system controller 802 determines that vehicle occupant 402 is angry or tired, for example.

Engine controller 12 may adjust engine operation including a position of an exhaust valve in response to a request from vehicle system controller 802 that is based on facial expressions and sounds of vehicle occupant 402 when vehicle system controller 802 determines that vehicle occupant 402 is angry or tired, for example.

Human/machine interface 422 allows vehicle passengers to interface with the vehicle system controller 804. The human/machine interface 422 allows passengers to request a vehicle passenger minder mode that may adjust vehicle conditions within passenger cabin 401 so that the emotional state of one or more vehicle occupants 402 may be changed to a desirable state. For example, cartoons or child programs may be activated and displayed on display 408 when the vehicle passenger minder system detects that a vehicle passenger is crying or angry.

Thus, the system of FIGS. 1-4, 7, and 8 provides for a vehicle system, comprising: a camera; a microphone; a suspension having an adjustable damping rate; an engine including an exhaust system with an adjustable exhaust valve; and a controller including executable instructions stored in non-transitory memory that cause the controller to adjust the exhaust valve to decrease noise produced via the engine in response to output of the camera. The vehicle system further comprises additional executable instructions to adjust the exhaust valve in response to output from the microphone. The vehicle system further comprises additional executable instructions to adjust output of an infotainment system in response to output of the camera. The vehicle system further comprises additional executable instructions to adjust vehicle lighting in response to output of the camera. The vehicle system further comprises additional executable instructions to adjust output of an infotainment system in response to output of a microphone. The vehicle system further comprises additional instructions to notify vehicle occupants in response to output of the camera. The vehicle system further comprises additional instructions to predict an emotional state of a vehicle passenger in response to output of the camera.

Figure 10:
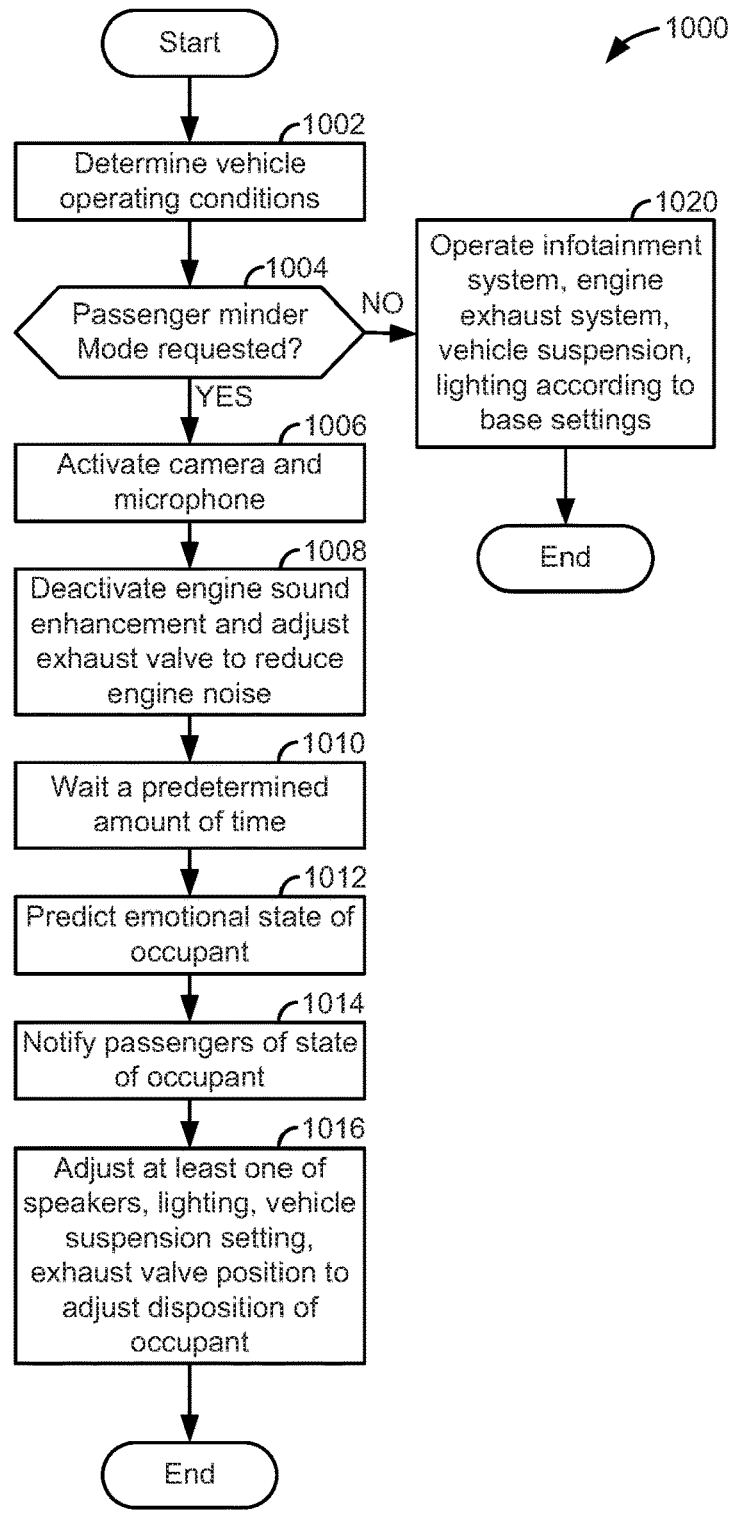
FIGS. 10 and 11 show example methods for operating a vehicle and changing a disposition of vehicle occupants.
Figure 11:
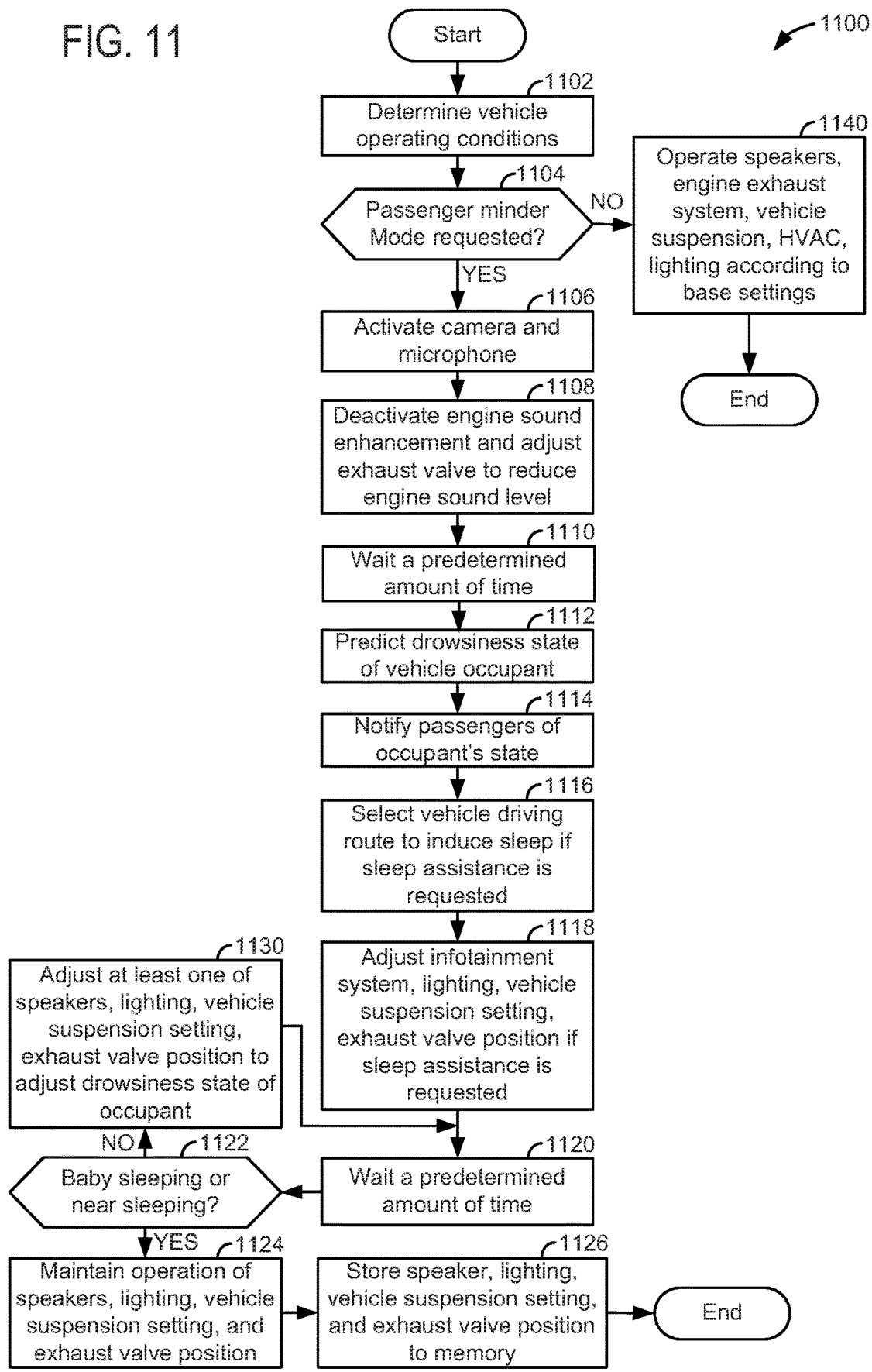

Referring now to FIG. 9, a vehicle operating sequence according to the methods of FIGS. 10 and 11 is shown. The vehicle operating sequence of FIG. 9 may be provided via the system of FIGS. 1-4, 7 and 8 in cooperation with the method of FIGS. 10 and 11. The plots shown in FIG. 9 are time aligned and occur at the same time. The vertical lines represent times of interest during the sequence.

The first plot from the top of FIG. 9 is a plot of operating state of a passenger (e.g., human child) minder system request versus time. The vertical axis represents the passenger minder system request state and the passenger minder system request is asserted when trace 902 is at a higher level near the vertical axis arrow. The passenger minder system request is not activated when trace 902 is at a lower level near the horizontal axis. Trace 902 represents the passenger minder system request state.

The second plot from the top of FIG. 9 is a plot of operating state of a camera (e.g., 408) versus time. The vertical axis represents the camera operating state and the camera is activated when trace 904 is at a higher level near the vertical axis arrow. The camera is not activated when trace 904 is at a lower level near the horizontal axis. Trace 904 represents the camera operating state.

The third plot from the top of FIG. 9 is a plot of operating state of a microphone (e.g., 406) versus time. The vertical axis represents the microphone operating state and the microphone is activated when trace 906 is at a higher level near the vertical axis arrow. The microphone is not activated when trace 906 is at a lower level near the horizontal axis. Trace 906 represents the microphone operating state.

The fourth plot from the top of FIG. 9 is a plot of a state of prediction of a passenger's state of mind or physical condition. The prediction may be based on images from camera 408 and sound detected by microphone 406. The vertical axis represents the state of detecting the state of mind or physical condition of a vehicle passenger. A prediction of the passenger's state of mind or physical condition is determined when trace 908 is at a higher level near the vertical axis arrow. The prediction of the passenger's state of mind or physical condition is not determined when trace 908 is at a lower level near the horizontal axis. Trace 908 represents the state of the prediction of the passenger's state of mind or physical condition.

The fifth plot from the top of FIG. 9 is a plot of operating state of speakers (e.g., 420) versus time. The vertical axis represents the speaker operating state and the speakers are activated when trace 910 is at a higher level near the vertical axis arrow. The speakers are not activated when trace 910 is at a lower level near the horizontal axis. Trace 910 represents the speaker operating state.

The sixth plot from the top of FIG. 9 is a plot of operating state of the vehicle suspension system (e.g., 104 and 810) versus time. The vertical axis represents the state of the vehicle suspension system and the vehicle suspension system is under control of the vehicle passenger minder system when trace 912 is at a higher level near the vertical axis arrow. The vehicle suspension system is not under control of the vehicle passenger minder system when trace 912 is at a lower level near the horizontal axis. Trace 912 represents the operating state of the vehicle suspension system.

The seventh plot from the top of FIG. 9 is a plot of a state of vehicle interior lighting (e.g., 404) versus time. The vertical axis represents the state of vehicle lighting and the state of vehicle lighting is activated when trace 914 is at a higher level near the vertical axis arrow. The vehicle lighting system is not activated when trace 914 is at a lower level near the horizontal axis. Trace 914 represents the vehicle lighting system state.

At time t0, the passenger minder mode request is not activated and the camera is not activated. The microphone is not activated and the vehicle passenger's state has not been predicted. The speakers have not been activated and the vehicle suspension system is not under control of the vehicle passenger minder system. The vehicle lighting is activated and it is not under control of the vehicle minder system.

At time t1, the passenger minder mode request is asserted. The passenger minder mode request may be input to the human/machine interface. The camera and microphone are activated in response to requesting the passenger minder mode be activated. Images from the camera and sounds sensed via the microphone are analyzed to determine if a passenger is tired, sleeping, or crying or aggravated. In one example, sounds and images are processed to determine the emotional state of the passenger. For example, if the person's mouth is determined to be open as shown in FIG. 5 and crying sounds are identified, it may be determined that the passenger is angry or aggravated. Alternatively, if the person's mouth is not open and only slight sounds are processed from the microphone, it may be determined that the person is happy. Further, if the camera captures images of the person's mouth being wide open without a sound from the person for a time, and then, the person's mouth is closed, it may be determined that the person is tired (e.g., yawning). In addition, if images from the camera indicate that a ratio of eye opening time to eye closing time is greater than a threshold, it may be determined that the person is tired. The vehicle passenger's emotional/physical state is not determined and the vehicle's speakers are not being controlled via the passenger minder system or in response to camera and microphone output. The vehicle's suspension is not being controlled via the passenger minder system or in response to camera and microphone output. Likewise, the vehicle's lighting system is not being controlled via the passenger minder system or in response to camera and microphone output.

At time t2, the passenger minder system has predicted the passenger's emotional/physical state. The vehicle's speakers, suspension system, and lighting are adjusted in response to the predicted passenger's emotional/physical state. In one example, the amount of lighting (e.g., lumens) provided to the rear seating area is reduced in response to predicting that the passenger is tired. In addition, the speakers are adjusted to stop producing engine emulation sounds or to reduce the sound level of engine sound emulations. Further, the vehicle suspension system is adjusted to soften the vehicle's suspension. These actions may make it easier for the passenger to sleep or remain sleeping.

In this way, the emotional or physical state of vehicle passengers may be predicted and vehicle operation may be adjusted in response to the vehicle passenger's predicted emotional or physical state. The example of FIG. 9 illustrates only one set of actions that may be taken to improve a passenger's comfort level.

Referring now to FIG. 10, a method for operating a vehicle is shown. At least portions of method 1000 may be implemented as executable controller instructions stored in non-transitory memory. Method 1000 may operate in cooperation with the system of FIGS. 1-4, 7, and 8. Additionally, portions of method 1000 may be actions taken in the physical world to transform an operating state of an actuator or device. The method of FIG. 10 may be incorporated into the system of FIGS. 1-4, 7, and 8 as executable instructions stored in non-transitory memory.

At 1002, method 1000 determines vehicle operating conditions. Vehicle operating conditions may include but are not limited to passenger cabin temperature, passenger cabin noise level, engine speed, engine load, and ambient lighting amount (e.g., lumens). The vehicle operating conditions may be determined via the sensors and actuators that are described herein. Method 1000 proceeds to 1004.

At 1004, method 1000 judges if the passenger minder mode is requested. Method 1000 may judge that the passenger minder mode is requested if there has been a passenger minder mode request input into the human/machine interface. In other examples, method 1000 may automatically engage and disengage the passenger minder mode when a passenger is detected in the rear seating area of the vehicle. The passenger may be detected via the camera. If method 1000 judges that the passenger minder mode is requested, the answer is yes and method 1000 proceeds to 1006. Otherwise, the answer is no and method 1000 proceeds to 1020.

At 1020, method 1000 operates the vehicle's speakers, exhaust system, suspension, lighting, and heating/ventilation/air conditioning (HVAC) according to base settings (e.g., settings that are not influenced via the passenger minder mode). In one example, the base settings may include operating the vehicle's speakers to enhance sounds of the vehicle's engine via generating sounds of an engine. The vehicle lighting may be adjusted to a level that is based on user input. The HVAC system may be adjusted to provide a predetermined passenger cabin temperature. The vehicle's suspension system and exhaust system may also be adjusted according to user input. For example, the suspension system may be adjusted to a stiffer position and the vehicle's exhaust system may be adjusted such that an exhaust valve (e.g., 7157) is fully open. Method 1000 proceeds to exit.

At 1006, method 1000 activates the camera and microphone and begins to monitor facial expressions and sounds in the passenger cabin. In one example, the camera and microphone monitor the rear seat area of the passenger cabin, which may be a preferred location in the vehicle for seating children. Method 1000 proceeds to 1008.

At 1008, method 1000 optionally deactivates engine sound enhancement and fully closes the exhaust valve to prevent exhaust flow through passage 7156. By deactivating the engine sound enhancement, method 1000 may reduce the sound level in the passenger cabin. In addition, method 1000 may baseline passenger cabin sound levels when engine sound levels are reduced via fully closing the exhaust valve. Further, deactivating the engine sound enhancement that is provided via the speakers may further reduce sound levels in the passenger cabin so that an emotional or physical state of one or more passengers may be predicted. The engine sound enhancement system may be deactivated via deactivating speakers in the passenger cabin or ceasing to generate simulated engine noise via the speakers. Method 1000 proceeds to 1010.

At 1010, method 1000 waits a predetermined amount of time before attempting to predict the emotional or physical state of one or more vehicle passengers. In one example, the predetermined amount of time may be two minutes so that the passenger's emotional state and/or physical state may be given time to adjust to the change in vehicle sound levels that may be due to the position of the exhaust valve and/or sound that may be generated via the speakers. Method 1000 proceeds to 1012 after the predetermined amount of time has expired.

At 1012, method 1000 predicts the emotional and/or physical state of one or more vehicle passengers. In one example, sounds and images are processed to determine the emotional state of the passenger. For example, method 1000 may apply facial recognition software and sound processing to predict if the passenger is happy or angry (e.g., emotional state). Further, method 1000 may apply the facial recognition and sound processing to predict if the vehicle passenger is crying (e.g., physical state). In one example, if the mouth of the person that is being monitored is open as shown in FIG. 5 and crying sounds are identified, it may be determined that the passenger is angry or aggravated. Alternatively, if the person's mouth is not open and only slight sounds are processed from the microphone, it may be determined that the person is happy. Also, if the camera and facial recognition software identifies tears, it may be predicted that the person's physical state is crying. Method 1000 proceeds to 1014 after the vehicle passenger's emotional and/or physical state is predicted.

At 1014, method 1000 notifies the emotional and/or physical state of the passenger to other passengers in the vehicle. In one example, the emotional and/or physical state of the passenger may be provided to the vehicle's human driver via an audible announcement via speakers or a visual indication via a human/machine interface. This may allow the driver to stay focused on the road while knowing the state of one or more passengers. Method 1000 proceeds to 1016 after providing the emotional and/or physical state of the passenger to the vehicle's driver or other passengers.

At 1016, method 1000 may adjust at least one of the operating state of one or more of speakers, lighting, heating ventilation and air conditioning system, vehicle suspension settings, and exhaust valve position in response to the emotional and/or physical state of the vehicle's passengers. In one example, method 1000 may decrease output of speakers that emulates engine noise. Method 1000 may also attempt to broadcast sounds through the speakers to reduce a sound level in the passenger cabin (e.g., active noise cancellation). Method 1000 may adjust a dampening level of vehicle suspension dampeners to smooth the vehicle's ride. Method 1000 may reduce or increase a temperature of a passenger cabin area in an attempt to change the passenger's disposition. Method 1000 may also adjust music genre, video genre (e.g., animation, storytelling, etc.), until the passenger minder system recognizes that the vehicle passenger is in a desired state (e.g., happy). These actions may be taken if the vehicle's passenger is predicted to be crying or angry so that the passenger's disposition may be changed. Additionally, the operating states of lighting, suspension, HVAC, exhaust valve, and speaker settings may be retrieved from controller RAM or ROM.

Method 1000 may also increase output of speakers that emulates engine noise if it is determined that the vehicle passenger has a change to a desired emotional state (e.g., happy) in the presence of sound that emulates engine sound. Method 1000 may also adjust a dampening level of vehicle suspension dampeners to provide a stiffer vehicle's ride if the vehicle passenger state indicates that the vehicle passenger prefers a stiffer vehicle suspension. In addition, method 1000 may adjust a position of an exhaust valve to partially open or fully open if the passenger is awake and is predicted to be happy while the exhaust valve is partially open or fully open. In one example, method 1000 may store states of the exhaust valve, speakers, lighting, HVAC system, and suspension in response to the vehicle passenger being in a desired state (e.g., happy) so that these same actuator settings may be recalled and output the next time the passenger is in the vehicle. Thus, method 1000 may learn speaker settings, exhaust valve settings, suspension settings, lighting settings, and HVAC settings so that passenger cabin conditions may be recreated at a time in the future when the passenger is aggravated or angry so that the passenger's emotional and/or physical state may be modified. If the vehicle occupant is already in a desired state (e.g., happy), method 1000 may not take any actions to adjust passenger cabin conditions. Method 1000 proceeds to exit after adjusting the speaker sound level and sound source (e.g., music genre or simulated engine sound), HVAC settings (e.g. passenger cabin temperature), vehicle suspension settings (e.g., dampening coefficient of dampeners), exhaust valve position, and lighting (e.g., lumen output).

Referring now to FIG. 11, a method for operating a vehicle is shown. At least portions of method 1100 may be implemented as executable controller instructions stored in non-transitory memory. Method 1100 may operate in cooperation with the system of FIGS. 1-4, 7, and 8. Additionally, portions of method 1100 may be actions taken in the physical world to transform an operating state of an actuator or device. The method of FIG. 11 may be incorporated into the system of FIGS. 1-4, 7, and 8 as executable instructions stored in non-transitory memory.

At 1102, method 1100 determines vehicle operating conditions. Vehicle operating conditions may include but are not limited to passenger cabin temperature, passenger cabin noise level, engine speed, engine load, and ambient lighting amount (e.g., lumens). The vehicle operating conditions may be determined via the sensors and actuators that are described herein. Method 1100 proceeds to 1104.

At 1104, method 1000 judges if the passenger minder mode is requested. Method 1100 may judge that the passenger minder mode is requested if there has been a passenger minder mode request input into the human/machine interface. In other examples, method 1100 may automatically engage and disengage the passenger minder mode when a passenger is detected in the rear seating area of the vehicle. The passenger may be detected via the camera. If method 1100 judges that the passenger minder mode is requested, the answer is yes and method 1100 proceeds to 1106. Otherwise, the answer is no and method 1100 proceeds to 1120.

At 1120, method 1100 operates the vehicle's speakers, exhaust system, suspension, lighting, and heating/ventilation/air conditioning (HVAC) according to base settings (e.g., settings that are not influenced via the passenger minder mode). In one example, the base settings may include operating the vehicle's speakers to enhance sounds of the vehicle's engine via generating sounds of an engine. The vehicle lighting may be adjusted to a level that is based on user input. The HVAC system may be adjusted to provide a predetermined passenger cabin temperature. The vehicle's suspension system and exhaust system may also be adjusted according to user input. For example, the suspension system may be adjusted to a stiffer position and the vehicle's exhaust system may be adjusted such that an exhaust valve (e.g., 7157) is fully open. Method 1100 proceeds to exit.

At 1106, method 1100 activates the camera and microphone and begins to monitor facial expressions and sounds in the passenger cabin. In one example, the camera and microphone monitor the rear seat area of the passenger cabin, which may be a preferred location in the vehicle for seating children. Method 1100 proceeds to 1108.

At 1108, method 1100 optionally deactivates engine sound enhancement and fully closes the exhaust valve to prevent exhaust flow through passage 7156. By deactivating the engine sound enhancement, method 1100 may reduce the sound level in the passenger cabin. In addition, method 1100 may baseline passenger cabin sound levels when engine sound levels are reduced via fully closing the exhaust valve. Further, deactivating the engine sound enhancement that is provided via the speakers may further reduce sound levels in the passenger cabin so that an emotional or physical state of one or more passengers may be predicted. The engine sound enhancement system may be deactivated via deactivating speakers in the passenger cabin or ceasing to generate simulated engine noise via the speakers. Method 1100 proceeds to 1110.

At 1110, method 1100 waits a predetermined amount of time before attempting to predict the emotional or physical state of one or more vehicle passengers. In one example, the predetermined amount of time may be two minutes so that the passenger's emotional state and/or physical state may be given time to adjust to the change in vehicle sound levels that may be due to the position of the exhaust valve and/or sound that may be generated via the speakers. Method 1100 proceeds to 1112 after the predetermined amount of time has expired.

At 1112, method 1100 predicts the drowsiness or tired state of one or more vehicle passengers. In one example, sounds and images are processed to determine the emotional state of the passenger. For example, method 1000 may apply facial recognition software and sound processing to predict if the passenger is drowsy or tired. Further, if the camera captures images of the person's mouth being wide open without a sound for a time, and then, the person's mouth is closed, it may be determined that the person is tired (e.g., yawning). In addition, if images from the camera indicate that a ratio of eye opening time to eye closing time is greater than a threshold, it may be determined that the person is drowsy or tired. In still other examples, method 1100 may measure a distance between an upper eye lid and a lower eye lid to estimate eye lid droop, which may be indicative of a passenger being tired or drowsy. Method 1100 proceeds to 1114 after the vehicle passenger's emotional and/or physical state is predicted.

At 1114, method 1100 notifies the drowsy or tired state of the passenger to other passengers in the vehicle if the passenger is determined to be drowsy. In one example, the drowsy or tired state of the passenger may be provided to the vehicle's human driver via an audible announcement via speakers or a visual indication via a human/machine interface. This may allow the driver to stay focused on the road while knowing the state of one or more passengers. Method 1100 proceeds to 1116 after providing the drowsy or tired state of the passenger to the vehicle's driver or other passengers.

At 1116, method 1100 may select a predetermined vehicle navigation route in response to the vehicle occupant being drowsy so that the vehicle occupant may find it easier to sleep. The navigation route may provide a certain road surface (e.g., smooth or undulating) that may be known to facilitate sleep by the vehicle occupant. In addition, the navigation route may provide a certain road shape (e.g., winding or straight in direction) that may be known to facilitate sleep by the vehicle occupant. If the vehicle is an autonomous vehicle, the vehicle may follow the predetermined navigation route. If the vehicle is driven via a human driver, the human driver may follow the predetermined navigation route to promote sleep of the vehicle occupant. Method 1100 proceeds to 1118.

At 1118, method 1100 adjusts the operating state of one or more of speakers, lighting, heating ventilation and air conditioning system, vehicle suspension settings, and exhaust valve position in response to the drowsy or tired state of the vehicle's passengers. In one example, method 1100 may decrease output of speakers that emulates engine noise if the vehicle occupant is determined to be tired or drowsy. Method 1100 may also attempt to broadcast sounds through the speakers to reduce a sound level in the passenger cabin (e.g., active noise cancellation). Method 1100 may adjust a dampening level of vehicle suspension dampeners to smooth the vehicle's ride. Method 1100 may reduce or increase a temperature of a passenger cabin area to improve changes of a passenger in the rear seating area to sleep. Further, method 1100 may adjust a position of an exhaust valve to a fully closed position so that a vehicle passenger in the rear seating area may sleep or fall asleep. In addition, method 1100 may lower a lighting power (e.g., reduce lumen output) when it is dark outside and the passenger is predicted to be tired to improve the passenger's possibility of sleeping. Method 1100 may also adjust music genre, video genre (e.g., animation, storytelling, etc.), until the passenger minder system recognizes that the vehicle passenger is in a desired state (e.g., sleeping). These actions may be taken if the vehicle's passenger is predicted to be drowsy so that the passenger may fall asleep. Additionally, the operating states of lighting, suspension, HVAC, exhaust valve, and speaker settings may be retrieved from controller RAM or ROM and activated if the vehicle occupant had previously fallen asleep to passenger cabin conditions.

In one example, method 1000 may retrieve and activate stored states of the exhaust valve, speakers, lighting, HVAC system, and suspension so that the vehicle's occupant may be exposed to conditions that previously helped the vehicle occupant to sleep when the method of FIG. 11 begins to be executed. Method 1100 proceeds to 1120 after adjusting the speaker sound level and sound source (e.g., music genre or simulated engine sound), HVAC settings (e.g. passenger cabin temperature), vehicle suspension settings (e.g., dampening coefficient of dampeners), exhaust valve position, and lighting (e.g., lumen output).

At 1120, method 1100 waits for a predetermined amount of time (e.g., four minutes) for the vehicle occupant to fall asleep or to quiet down. Method 1100 proceeds to 1122 after the predetermined amount of time has passed.

At 1122, method 1100 judges if the vehicle occupant is sleeping or nearly sleeping (e.g., ratio of eye open time to eye close time is less than 0.5). Method 1100 may judge that the vehicle occupant is sleeping or nearly sleeping via the ratio of the amount of time that a vehicle occupant's eyes are open to an amount of time the vehicle occupant's eyes are closed. If method 1100 judges that the vehicle occupant is sleeping or nearly sleeping, the answer is yes and method 1100 proceeds to 1124. Otherwise, the answer is no and method 1100 proceeds to 1130.

At 1130 method 1100, may adjust at least one of the speakers, lighting, heating ventilation and air conditioning system, vehicle suspension settings, and exhaust valve position in response to the vehicle's passenger not sleeping or in response to no perceived change in the ability of the vehicle's passenger to fall asleep. In one example, method 1100 may decrease output of speakers that emulates engine noise and/or change music genre (e.g., change from pop music to music played by a symphony). Method 1100 may also attempt to broadcast sounds through the speakers to reduce a sound level in the passenger cabin (e.g., active noise cancellation). Method 1100 may also adjust a dampening level of vehicle suspension dampeners to smooth the vehicle's ride further. Method 1000 may reduce or increase a temperature of a passenger cabin area in an attempt to induce sleep in the vehicle passenger. Method 1100 may also adjust video genre (e.g., animation, storytelling, etc.) to induce sleep in the vehicle occupant. These actions may be taken to improve the likelihood of the vehicle's passenger entering a state of sleep. Method 1100 returns to 1120 after making one or more adjustments to improve the likelihood of the vehicle passenger entering a state of sleep.

At 1124, method 1100 maintains operation of vehicle speakers, suspension, video displays, HVAC, exhaust valve, and lighting so that the vehicle occupant may remain in a state of sleep. Method 1100 proceeds to 1126.

At 1126, method 1100 stores speaker settings (e.g., music or audible program playing through the speakers), lighting settings (e.g., lumen level), vehicle suspension settings (e.g., damping level), and exhaust valve position to controller memory (e.g., RAM or ROM). These setting may be the basis for inducing sleep in the vehicle occupant at a later time. Method 1100 proceeds to exit.

In this way, passenger cabin conditions may be adjusted to help a vehicle occupant (e.g., a child) to sleep. In addition, once the conditions within the passenger cabin are conducive for the vehicle occupant to sleep, the conditions may be stored to controller memory (e.g., RAM or ROM) so that they may be activated to induce sleep in a vehicle occupant at a later time.

Thus, methods of FIGS. 10 and 11 may provide for a vehicle operating method, comprising: monitoring facial expressions of a vehicle occupant via a camera; and adjusting a position of an exhaust valve of an engine in response to the monitored facial expressions via a controller. The method further comprises detecting audible sounds emitted via the vehicle occupant and adjusting the position of the exhaust valve in response to the audible sounds. The method further comprises storing the position of the exhaust valve to memory of a controller in response to the monitored facial expressions indicating that the vehicle occupant is sleeping. The method further comprises storing the position of the exhaust valve to memory of a controller in response to the monitored facial expressions indicating that the vehicle occupant has changed from a first emotional state to a second emotional state. The method further comprises adjusting output of an engine sound enhancement system in response to the monitored facial expressions. The method includes where monitoring the facial expressions includes estimating an amount of eye lid droop. The method includes where monitoring the facial expressions includes determining that the vehicle occupant is yawning.

The method of FIGS. 10 and 11 also provide for a vehicle operating method, comprising: monitoring facial expressions of a vehicle occupant via a camera; and adjusting a suspension setting of a vehicle in response to the monitored facial expressions via a controller. The method includes where adjusting the suspension setting includes adjusting a suspension setting to reduce damping of a suspension of a vehicle. The method includes where adjusting the suspension setting includes adjusting a suspension setting to increase damping of a suspension of a vehicle. The method further comprises monitoring audible noise from the vehicle occupant and adjusting the suspension setting of the vehicle in response to the audible noise. The method further comprises notifying occupants of a vehicle of a predicted emotional state of the vehicle occupant. The method further comprises changing a music genre in response to the monitored facial expressions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
   monitoring facial expressions of a vehicle occupant via a camera;
   monitoring sounds of the vehicle occupant via a microphone; and
   adjusting a position of an exhaust valve of an engine in response to the monitored facial expressions and the monitored sounds of the vehicle occupant via a controller.

2. The method of claim 1, further comprising:
   storing the position of the exhaust valve to memory of the controller in response to the monitored facial expressions indicating that the vehicle occupant is sleeping; and
   fully closing the exhaust valve to reduce engine noise via the controller in response to a passenger minder mode being activated, where monitoring facial expressions of the vehicle occupant and monitoring sounds of the vehicle occupant are activated in the passenger minder mode.

3. The method of claim 1, further comprising storing the position of the exhaust valve to memory of the controller in response to the monitored facial expressions indicating that the vehicle occupant has changed from a first emotional state to a second emotional state.

4. The method of claim 1, further comprising adjusting output of an engine sound enhancement system in response to the monitored facial expressions.

5. The method of claim 4, further comprising estimating an amount of eye lid droop via the controller.

6. The method of claim 4, further comprising determining that the vehicle occupant is yawning via the controller.

\* \* \* \* \*